US008183798B2

(12) United States Patent
Mayer et al.

(10) Patent No.: US 8,183,798 B2
(45) Date of Patent: May 22, 2012

(54) VARIABLE LIGHT CONTROL SYSTEM AND METHOD USING MOMENTARY CIRCUIT INTERRUPT

(75) Inventors: Thomas J. Mayer, Wisconsin Dells, WI (US); Glenn D. Garbowicz, Huntley, IL (US)

(73) Assignee: Hubbell Incorporated, Shelton, CT (US)

( * ) Notice: Subject to any disclaimer, the term of this patent is extended or adjusted under 35 U.S.C. 154(b) by 323 days.

(21) Appl. No.: 12/573,871

(22) Filed: Oct. 5, 2009

(65) Prior Publication Data

US 2011/0080105 A1 Apr. 7, 2011

(51) Int. Cl.

| | |
|---|---|
| ***H05B 37/00*** | (2006.01) |
| ***H05B 39/00*** | (2006.01) |
| ***H05B 41/00*** | (2006.01) |
| *H05B 41/16* | (2006.01) |
| *H05B 41/24* | (2006.01) |
| *H02J 3/00* | (2006.01) |

(52) U.S. Cl. .......... 315/313; 307/41; 315/246; 315/250; 315/312

(58) Field of Classification Search ........................ None
See application file for complete search history.

(56) References Cited

U.S. PATENT DOCUMENTS

| | | | | |
|---|---|---|---|---|
| 4,322,632 A * | 3/1982 | Hart et al. | ........................ | 307/41 |
| 4,390,814 A | 6/1983 | Peek | | |
| 4,480,197 A | 10/1984 | Hollaway | | |
| 4,488,092 A | 12/1984 | Chikuma | | |
| 4,700,110 A | 10/1987 | McNair | | |
| 4,766,353 A | 8/1988 | Burgess | | |
| 4,794,271 A | 12/1988 | McNair | | |
| 4,802,073 A | 1/1989 | Plumly | | |
| 4,837,455 A * | 6/1989 | Sleator | ............................ | 307/38 |
| 4,879,495 A | 11/1989 | Yamamoto | | |
| 4,888,494 A | 12/1989 | McNair | | |
| 4,896,079 A * | 1/1990 | Tabor | ............................ | 315/313 |
| 4,896,083 A | 1/1990 | Kopala | | |
| 4,985,662 A | 1/1991 | Wilcocks | | |
| 5,194,781 A | 3/1993 | Konopka | | |
| 5,373,218 A | 12/1994 | Konopka et al. | | |
| 5,610,448 A | 3/1997 | Dattilo | | |
| 5,798,581 A | 8/1998 | Keagy | | |
| 5,798,620 A | 8/1998 | Wacyk | | |
| 5,808,423 A | 9/1998 | Li et al. | | |

(Continued)

FOREIGN PATENT DOCUMENTS

WO WO-9743880 A1 11/1997

OTHER PUBLICATIONS

*UltraMax Dimming* by General Electric (Apr. 2008).

(Continued)

*Primary Examiner* — Douglas W Owens
*Assistant Examiner* — Dedei K Hammond
(74) *Attorney, Agent, or Firm* — Stan Torgovitsky; Mark S. Bicks; Alfred N. Goodman

(57) ABSTRACT

An electronic circuit designed to reduce energy consumption by toggling between a plurality of conventional or electronic fluorescent lighting ballasts within a given fixture, and where said toggle circuit shall increase or decrease fixture light output levels according to immediate requirements. Toggle circuit may be remotely controlled from conventional Mains wall switch or other such means. Initial applications of Mains power automatically provides the minimum of light levels. Additional momentary interruptions to Mains power provides varied and/or additional lighting levels.

12 Claims, 6 Drawing Sheets

U.S. PATENT DOCUMENTS

| | | | |
|---|---|---|---|
| 6,561,678 | B2 | 5/2003 | Loughry |
| 6,667,585 | B2 | 12/2003 | O'Meara |
| 6,731,080 | B2 | 5/2004 | Flory |
| 6,960,892 | B2 | 11/2005 | Loughrey |
| 7,199,531 | B2 | 4/2007 | Loughry |

OTHER PUBLICATIONS

*Quicktronic PROStart T8 Quickstep Bi-Level Dimming* by OSRAM Sylvania (Mar. 2008).

Motorola *Semiconductor Technical Data moc 3082.*

* cited by examiner

VARIABLE LIGHT CONTROL SYSTEM AND METHOD USING MOMENTARY CIRCUIT INTERRUPT

BACKGROUND OF THE INVENTION

1. Field of the Invention

The present invention is directed in general to lighting devices and control methods that facilitate reduction of energy consumption, and more specifically to adjustable lighting levels.

2. Discussion of the Background

Lighting systems include fixture with plurality of light sources that are driven by individual power supplies (driver devices), or a single power supply connected to the Mains (source of AC voltage). Conventional control systems for varying the level of light output by the light fixture include those configure to control AC power from the Mains to the fixtures' power supply, and those that control the output from the power supply to the fixtures' light soure(s).

For example, in certain applications, conventional control devices automatically decrease the power supplied to light sources after energizing the light sources at high energy level.

In other applications, conventional control devices provide multiple electronic switches to individually control power output from each of a plurality of power supplies to corresponding light sources within a fixture.

Thus, conventional lighting control solution suffer at least the drawbacks of wasting power for initial high energy start of light sources when low level of light would suffice and/or requiring multiple electronic switches to individually control each of the power supplies within a multi-light source fixture.

SUMMARY OF THE INVENTION

The present invention provides, addresses at least the above-noted drawbacks and provides devices and methods for controlling light output and reducing power consumption by, for example, circuitry that can toggle between a plurality of drivers within a given fixture, to facilitate increase or decrease the fixture's light output levels according to immediate requirements.

The circuit, according to exemplary implementations, may be remotely controlled from conventional Mains wall switch or other such means. Further, according to the embodiments of the present invention, initial applications of Mains power automatically provides the minimum of light levels, while additional momentary interruptions to Mains power provides varied and/or additional lighting levels.

An exemplary embodiment of a control circuit according to the present invention comprises a power supply circuit, a toggle circuit and a switch circuit. The power supply circuit is connected to an AC power source, the AC power source supplying AC power to a lighting system comprising a first driver for powering a first light source and a second driver for powering a second light source. The toggle circuit can be configured to be responsive to a power level of the power supply circuit and provide a control output based on the power level. The switch circuit receives the control output from the toggle circuit and to controls supply of the AC power to at least the second driver of the second light source based on the control output of the toggle circuit. Initial application of the AC power to the power supply circuit causes a first driver to turn ON the first light source. A first momentary interruption of the applied AC power to the power supply circuit detected by the toggle circuit after the initial application of the AC power causes the switch circuit to supply the AC power the second driver to turn ON the second light source.

In another exemplary embodiment of a control circuit according to the present invention, the lighting system further comprises a third light sources, such that, for example, the first light source provides ⅓ output of the lighting system, the second light source provides ⅔ output of the lighting system, and the third light sources is comprised of the first and second light sources to provide full (⅓+⅔) output of the lighting system. According to an exemplary implementation, initial application of the AC power to the power supply circuit causes a first driver to turn ON the first light source. A first momentary interruption of the applied AC power to the power supply circuit detected by the toggle circuit after the initial application of the AC power causes the switch circuit to cut the supply of the AC power to the first driver to turn OFF the first light source and to supply the AC power to the second driver to turn ON the second light source. A second momentary interruption of the applied AC power after the first momentary interruption causes the switch circuit to supply the AC power to the first driver to turn ON the third light source.

Another exemplary embodiment of the present invention provides a method for controlling application of AC voltage including selectively supplying AC power to a first driver of a lighting system when initially supplying the AC power to the lighting system, the lighting system comprising a first driver for powering a first light source and a second driver for powering a second light source. The method further includes determining if a momentary interrupt of the AC power has occurred after initially supplying the AC power, and supplying the AC power to at least the second driver of the second light source when determining that a first momentary interruption of the AC power has occurred.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EXEMPLARY EMBODIMENTS OF THE INVENTION

Figure 1:
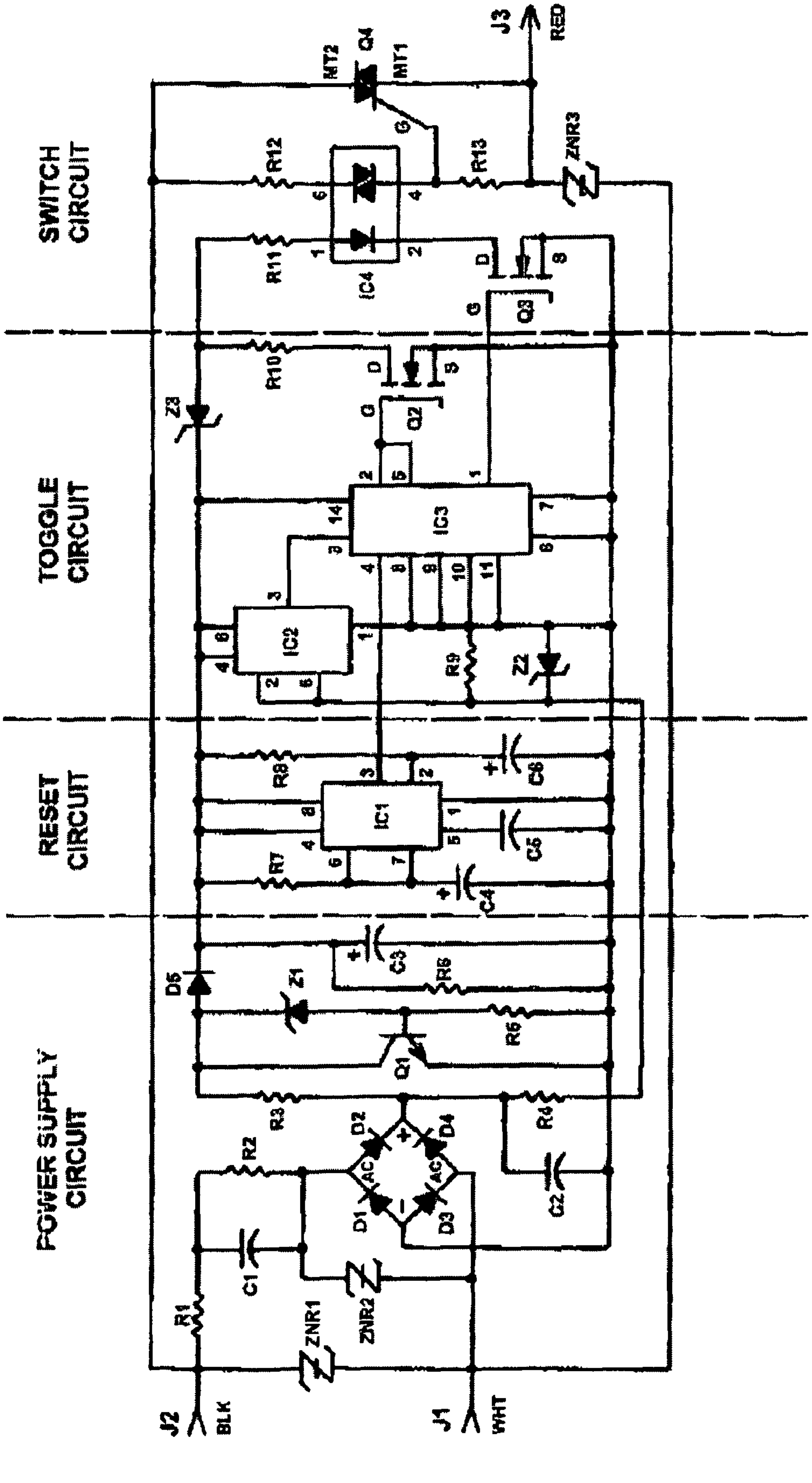
FIG. 1 is a circuit diagram illustrating an exemplary implementation of an embodiment of the present invention.

Referring now to the drawings, wherein like numerical and character references designate identical or corresponding parts throughout the several views, embodiments of the present invention are shown in schematic detail.

Referring to FIG. 1, a schematic representation of an exemplary implementation is illustrated with reference to an Energy Saving Toggle Switch (a non-limiting description of certain embodiments as referenced herein below) showing a toggle circuit for use with two (2) conventional or electronic fluorescent ballasts providing two (2) light output levels.

Figure 2:
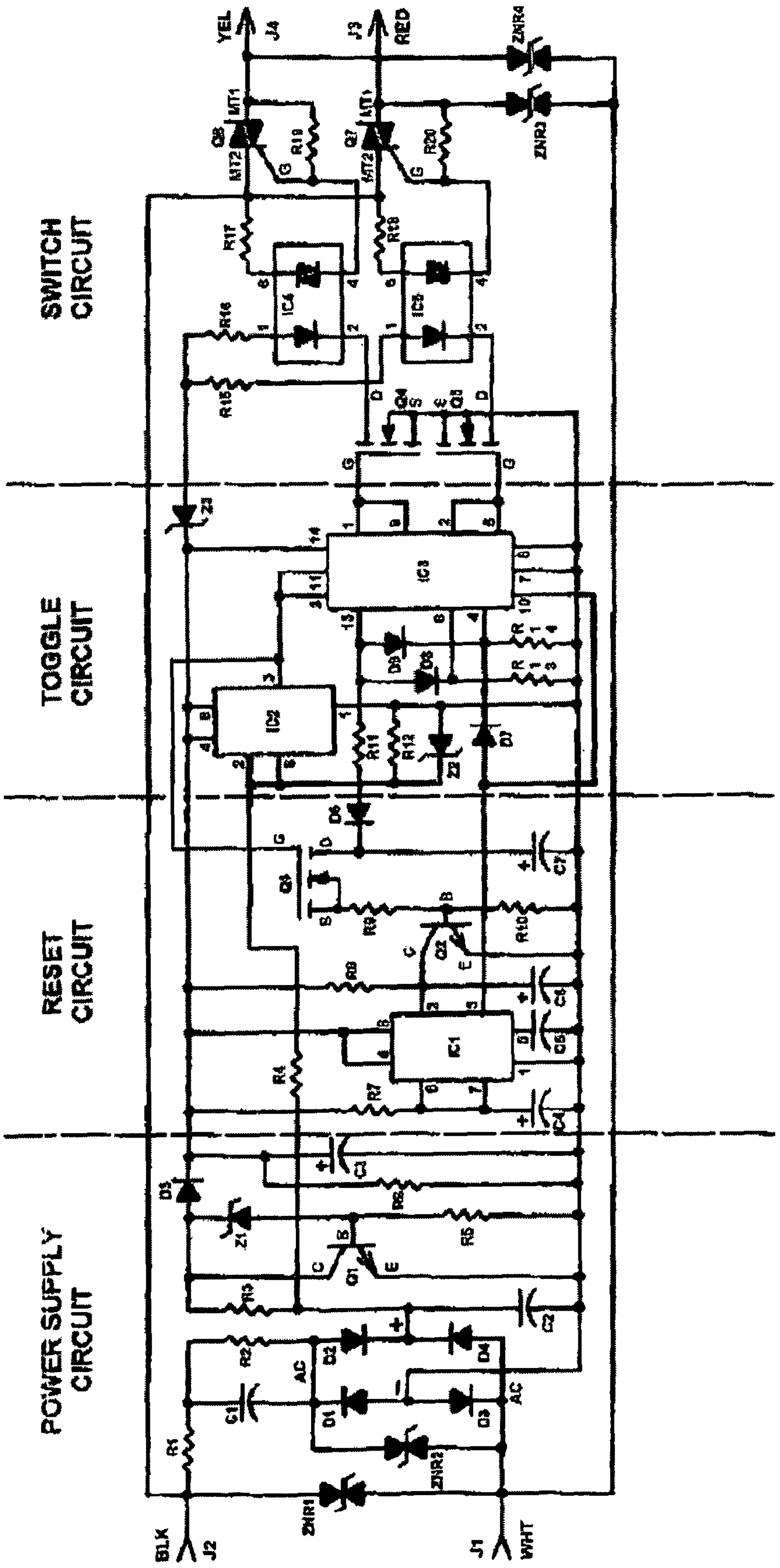
FIG. 2 is a circuit diagram illustrating an exemplary implementation of another embodiment of the present invention.

FIG. 2 is a schematic representation of another exemplary implementation showing a toggle circuit for use with three (3) conventional or electronic fluorescent ballasts providing three (3) output levels.

Figure 3:
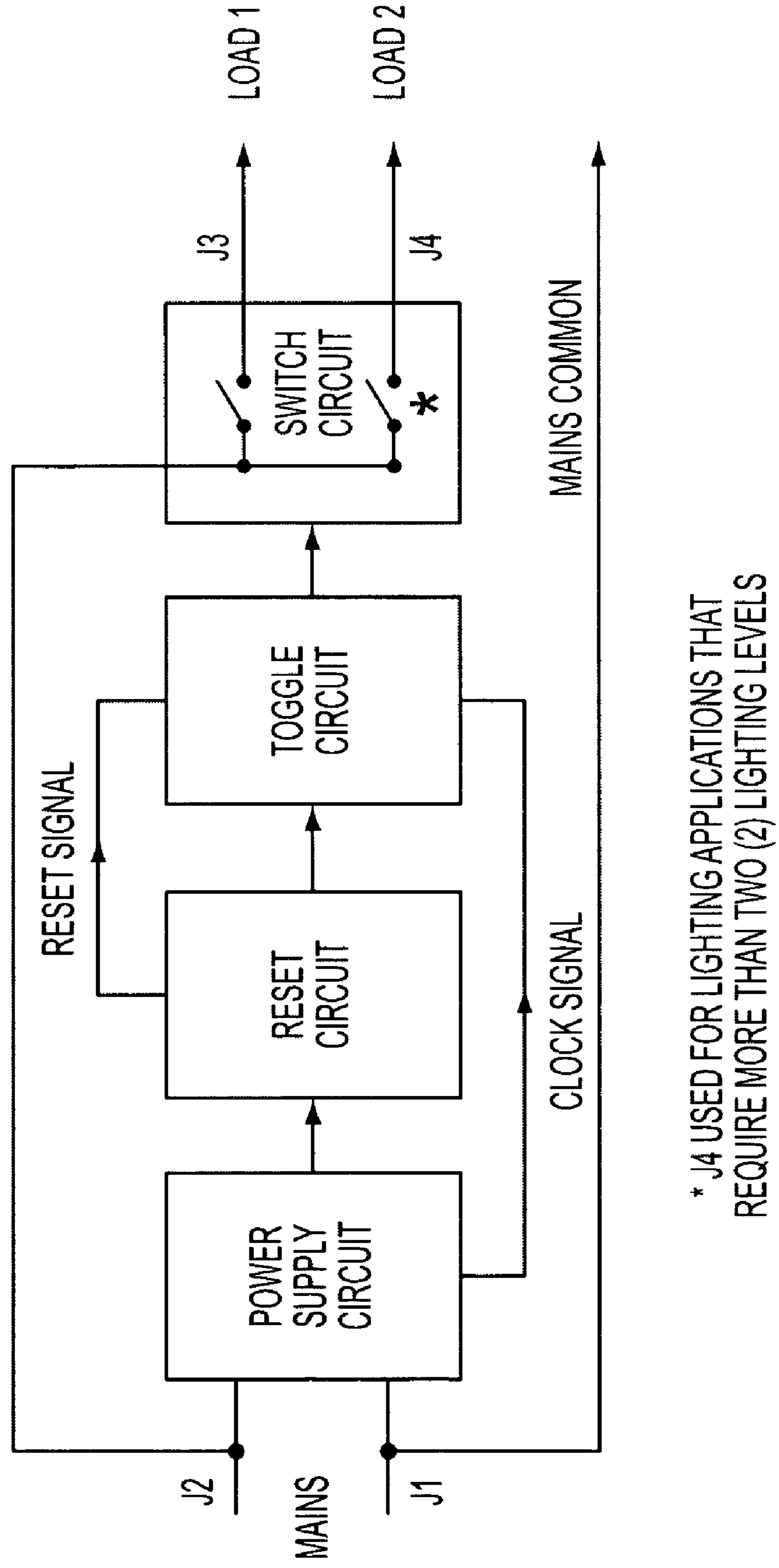
FIG. 3 shows in block diagram an example of component configuration and signal flow according to exemplary embodiments of the present invention.

FIG. 3 is a block diagram representing exemplary implementation comprising four (4) basic circuits configured as shown therein.

Figure 4:
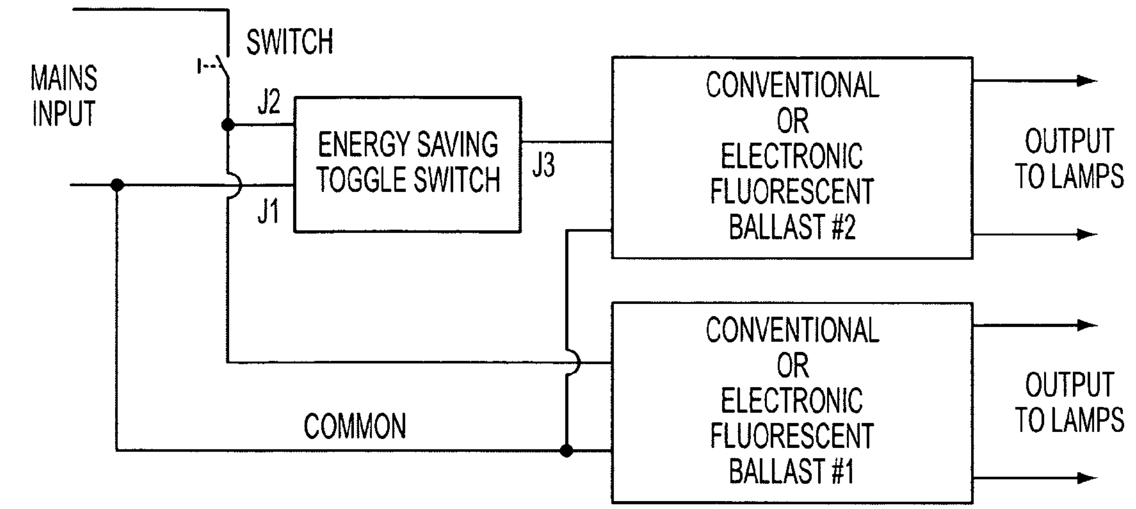
FIG. 4 is a diagram illustrating an exemplary application according to certain non-limiting implementations of an embodiment of the present invention.
Figure 5:
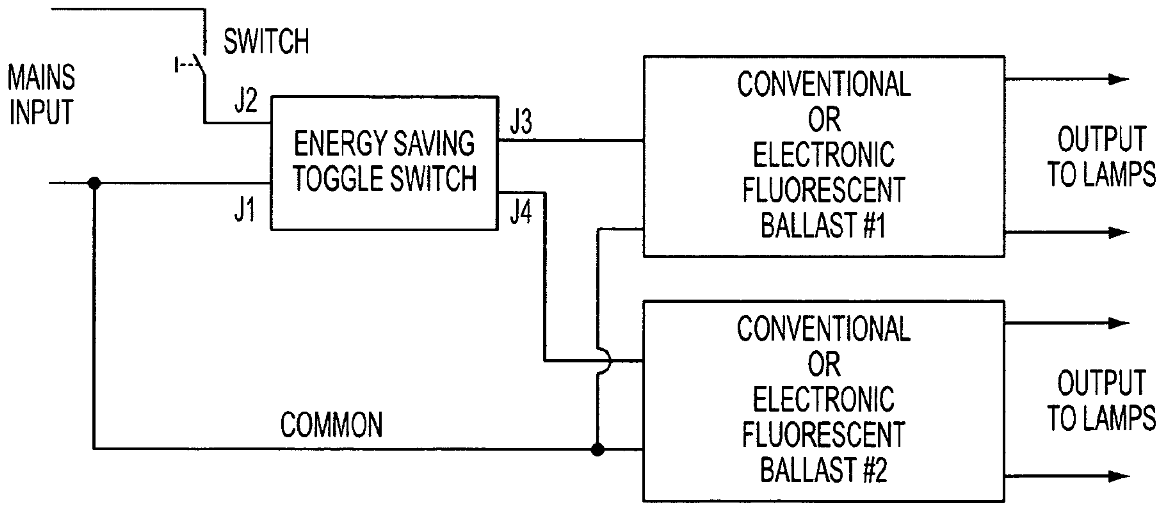
FIG. 5 is a diagram illustrating an exemplary application according to certain non-limiting implementations of another embodiment of the present invention.

FIG. 4 is a representative drawing depicting an exemplary implementation of a typical application of an embodiment of the present invention comprising a two (2) level lighting toggle circuit, while FIG. 5 is a representative drawing depicting an exemplary implementation of a typical application of the present invention comprising a three (3) level lighting toggle circuit.

According to an exemplary implementation, an Energy Saving Toggle Switch for use with two (2) conventional or electronic fluorescent ballasts capable of providing two (2) lighting levels is comprised of the following four (4) circuits:

1) A Power Supply Circuit comprised of ZNRi, ZNR2, DI-D5, CI-C3, R1-R6, Z1 Q1
2) A Reset Circuit comprised of R7, R8, C4-C6, IC1
3) A Toggle Circuit Comprised of R9, R10, Z2, Z3, IC2, IC3, Q2
4) A Switch Circuit comprised of Q3, Q4, R11-R13, ZNR3 and IC3

According to another exemplary implementation, the Energy Saving Toggle Switch for use with two (2) conventional or electronic fluorescent ballasts capable of providing three (3) lighting levels is comprised of the following four (4) circuits:

1) A Power Supply Circuit comprised of ZNR1, ZNR2, D1-D5, C1-C3, R1-R3, R5, R6, Z1, Q1
2) A Reset Circuit comprised of R4, R7-R10, C4-C7, Q2, Q3, D6, IC1
3) A Toggle Circuit comprised of R11-R14, D7-D9, Z2, Z3, IC2, IC3
4) A Switch Circuit comprised of Q4-Q7, R15-R20, IC4, ZNR3, ZNR4

Description of Exemplary Circuit Designs for Various Component of the Non-Limiting Implementation of Embodiments of the Present Invention are as Follows:

Each exemplary circuit description is based upon schematic representations for that particular circuit, and where the first description will be that of a two (2) lighting level control circuit (FIG. 1), followed by a circuit description of a three (3) level lighting control circuit (FIG. 2).

Power Supply Circuit: (Refer to FIG. 1)

The Power Supply Circuit is comprised of ZNR1, ZNR2, D1-D5, C1-C3, R1-R6, Z1 and Q1. Mains power is supplied to input terminals J1 and J2, where input terminal J1 is representative of Mains Neutral or Common, and where input terminal J2 is representative of Mains Line. ZNR2, a bidirectional surge suppressor is connected across Mains input terminals J1 and J2 in order to protect the remainder of circuitry from damage due to Mains overvoltage or excessive Mains voltage spikes. Rectifier diodes D1-D4 form a full wave rectifier bridge where Mains neutral (J1) is terminated at an AC junction of rectifier bridge comprised of rectifier D3 cathode and rectifier D4 anode.

Mains line (J2), being passed through inrush current limiting resistor R1, and connected in series with capacitor C2 and is terminated to the remaining AC junction of rectifier bridge comprised of D1 cathode and D2 anode, and where capacitor C1 serves to provide a constant current source.

Bleeder resistor R2 has been incorporated across capacitor C1 in order to dissipate any residual electrical charge stored within capacitor C2 after removal of AC Mains. A second bi-directional surge suppressor ZNR2 is incorporated across the two (2) AC inputs of rectifier bridge to limit AC voltage potentials generated by the charging of capacitor C1 during initial application of Mains voltage.

A shunt type voltage regulator is comprised of NPN transistor Q1, bias resistor R5 and zener diode Z1, and where DC voltage potential at cathodes of rectifiers D2 and D4 are connected to Collector of transistor Q1 via second inrush current limiting resistor R3 and where transistor Q1 Emitter is connected to anodes of rectifiers D1 and D3 representing DC power supply negative (−). Bias resistor R5 is connected between power supply negative (−) and Base of transistor Q1, such that transistor Q1 is held in a non-conducting state until such time as positive (+) voltage potential exceeds the avalanche voltage of zener diode Z1. Upon forward conduction of zener diode Z1, transistor Q1 is forced into a conducting state, effectively placing a load across output of rectifier bridge D1-D4, maintaining the overall DC voltage to that of the avalanche or zener voltage of zener diode Z1, thus maintaining a constant DC voltage potential between Collector and Emitter of Transistor Q1. A filter capacitor C3 and bleeder resistor R6 are provided across DC power supply in order to smooth DC ripple present across rectifier bridge D1-D4, and where blocking diode is placed between shunt regulator portion of power supply and filter capacitor C3, thus preventing energy stored within capacitor C3 from feeding back into cathodes of rectifier diodes D2 and D4. Filter capacitor C2 and current limiting resister R4 will be discussed in the Toggle Circuit.

Power Supply Circuit: (Refer to FIG. 2)

The Power Supply Circuit is comprised of ZNR1, ZNR2, D1-D5, C1-C3, R1-3, R5, R6, Z1 and Q1.

The Power Supply Circuit is comprised of ZNR1, ZNR2, D1-D5, C1-C3, R5, R6, Z1 and Q1. The Power supply circuit is designed to control two (2) conventional or electronic fluorescent ballasts, and is electrically identical to that depicted in (1*a*) above, with the exception that current limiting resistor R4 is located in Reset Circuit. Filter capacitor C2 and current limiting resistor R4 will be discussed in the Toggle Circuit.

Reset Circuit: (Refer to FIG. 1)

The Reset Circuit is comprised of R7, R8, C4-C6 and IC1. The Reset Circuit serves to clear any data that may inadvertently be stored within the Toggle Circuit after prolonged absence of Mains supply. IC1 represents an integrated circuit timer, where pins #4 and #8 of ICI are connected to regulated power supply positive (+) and pin #1 being connected to power supply negative (−) and where pins #6 and #7 of IC1 represent the Threshold and Discharge portions of IC1 respectively. Pin #5 represents timer compensation where capacitor C5 provides for timer circuit stability. Pin #3 represents timer output and will be addressed in Toggle Circuit. Pin #2 represents the Trigger input of IC1, where a momentary 'low' applied to this pin initiates a timing cycle, and where said 'low' is momentarily provided by capacitor C6, which rests in a discharged state prior to the applications of Mains voltage to terminals J1 and J2 as described above. Upon application of Mains, trigger capacitor C6 will begin to charge via resistor R8 until capacitor C6 equals that of DC supply voltage (+), thus releasing trigger pin #2 from 'low' state and forcing output pin #3 to 'high' or power supply positive (+). The duration of the timing cycle of IC1 is determined by R/C time constant derived from timing resistor R7 and timing capacitor C4.

Where Mains voltage is present at input terminals J1 and J2, timer IC1 will complete one reset timing cycle, allowing pin #3 to return to and maintain a 'low' state until such time as the Mains voltage has been removed allowing trigger capacitor C6 to discharge. Re-applications of Mains voltage will repeat the cycle described above.

Reset Circuit: (Refer to FIG. 2)

The Reset Circuit is comprised of R4, R7-R10, C4-C7, Q2, Q3, D6 and IC1. The function of IC1 reset timer is identical to that described in RESET circuit of FIG. 1 above, with the following additions:

As described in reset circuit of FIG. 1 above, the Reset Circuit must toggle between two (2) lighting levels, that being Low and High, and the trigger capacitor C6 will discharge slowly upon removal of Mains supply.

The circuit described herein must toggle between three (3) lighting levels, that being Low, Medium, and High, and therefore, is necessary to discharge trigger capacitor C6 more rapidly after the removal of Mains power. This is accomplished by NPN transistor Q2 where collector of Q2 is connected to the positive (+) terminal of trigger capacitor, and the emitter of Q2 is connected to the negative (−) terminal of trigger capacitor C6 and power supply negative (−). The base of transistor Q2 is connected to supply negative (−) via bias resistor R10, intended to offset leakage currents formed by transistor Q2 or transistor Q3. Transistor Q3 serves as a discrete logic device, such that power supply positive (+) must be provided to Drain terminal via steering diode D6 and Gate terminal via Toggle Circuit in order to forward bias (turn on) transistor Q3. Source terminal of transistor Q3 provides forward bias to transistor Q2 via current limiting resistor R9, thus discharging trigger capacitor C6 to power supply negative (−) potential. As the reset pulse provided to the Drain of transistor Q3 via steering diode D6 is of limited duration, capacitor C7 stores sufficient energy for transistor Q3 to remain in a conductive state for a period greater than that required for a transistor Q2 to discharge trigger capacitor C6.

Toggle Circuit (Refer to FIG. 1)

The Toggle Circuit is comprised of R9, R10, Z2, Z3, IC2, IC3 and Q3, where IC2 serves as a voltage detector. With pins #4 and #8 of IC2 connected to power supply positive (+) and pin #1 connected to power supply negative (−), circuitry internal to IC2 provides a voltage detection circuit based upon ⅓ and ⅔ that of power supply voltage, where pin #2 is referenced to ⅓ that of power supply voltage, where pin #6 is referenced to ⅔ that of power supply voltage. Refer to Power Supply Circuit portion of schematic drawing and note that capacitor C2 and resistor R4 are connected to the unfiltered positive (+) output portion of rectifier bridge D1-D4, and where the remaining terminal of capacitor C2 is connected to the power supply negative (−), such that capacitor C2 provides a minimal level of filtering. Resistor R4 is connected to pins #2 and #6 of IC2, and where resistor R9 serves to rapidly discharge capacitor C2 via resistor R4 to power supply negative (−), while zener diode Z2 serves to limit the peak DC voltages made available to pins #2 and #6 of IC2.

IC3 represents a dual flip-flop, and where only one half (½) of flip-flop is utilized in this circuit, and is represented by output pins #1 and #2, and where only one of the two output pins may be at power supply positive (+) potential at any given time, while the remaining pin will be held at the opposite power supply potential. The appropriate application of voltage level to Clock input pin #3 and Reset input pin #4 of IC3 will force the two output pins #1 and #2 to reverse states or toggle, such that the output pin originally held positive (+) now rests to negative (−) potential and the output pin held at power supply negative (−) now transitions to power supply positive (+).

Upon application of Mains supply to input terminals J1 and J2, Reset Circuit IC1 provides a brief positive (+) reset pulse to Reset pin #4 of IC3, clearing any data previously stored in flip-flop IC3. Simultaneously, IC2 provides a signal to Clock pin #3 of IC3 due to a DC voltage made available at pins #2 and #6 of IC2 via resistor R4 located in power supply portion of FIG. 1.

The output pin #3 of IC2 will remain at power supply positive (+), thus holding flip-flop IC3 output pin #1 at power supply negative (−) until Mains voltage has been momentarily interrupted. Conversely when output pin #1 of IC3 is held at power supply negative (−), output pin #2 of IC3 will remain at power supply positive (+).

Output pin #2 serves to hold Data pin #5 of IC3 at power supply positive (+), so as to allow the next incoming pulse generated by voltage detector IC2 to flip the output of IC2 such that output pin #1 of IC2 transitions to power supply positive (+) and output pin #2 of IC2 to transition to power supply negative (−). The function of zener diode Z3 and transistor Q2 will be discussed under Switch Circuit.

Toggle Circuit: (Refer to FIG. 2)

The Toggle Circuit is comprised of R11-R14, Z2 Z3, D7-D9, IC2 and IC3, where IC2 serves as a voltage detector as described in Toggle Circuit of FIG. 1 above.

IC3 represents a dual flip-flop, where both portions of the flip-flop are utilized in this circuit. Upon initial application of Mains power to input terminals J1 and J2, a reset pulse is generated by Reset Circuit IC1 as described above. The Reset pulse created by pin #3 of IC1 is momentarily applied directly to IC1 as described above. The Reset Pulse created by pin #3 of IC1 is momentarily applied directly to IC3 reset pin #10 and indirectly to reset pin #4 of IC3 via steering diode D7. In IC3, this reset pulse forces output pin #2 of first flip-flop to power supply positive (+) and output pin #1 of first flip-flop and output pin #13 of second flip-flop to power supply negative (−).

By intentionally providing a first momentary interruption of Mains supply to input terminals J1 and J2, Toggle Circuit IC2 provides a brief transition pulse between power supply negative (−) and power supply positive (+) to Clock pin #3 and #11 of first and second flip-flop respectively, forcing first and second flip-flop to toggle. Note that a positive pulse is also provided by pin #3 of IC2 to Gate of Q3, and having no effect on Q3, as Drain of Q3 is currently at power supply negative (−) potential. After toggle, output pin #2 of first flip-flop transitions to power supply negative (−) and output pin #1 of first flip-flop transitions to power supply positive (+).

By intentionally providing a second momentary interruption of Mains supply as described above, Toggle Circuit IC2 provides another brief transition pulse between power supply negative (−) and power supply positive (+) to Clock pins #3 and #11 of the first and second flip-flop respectively, allowing the second flip-flop to toggle and causing the second flip-flop output pin #13 to go to power supply positive (+). As output pin #13 rises to power supply positive (+) potential, a positive voltage is applied to first flip-flop Reset pin #4 via steering diode D9 and first flip-flop Set pin #6 via steering diode D8 and Drain of transistor Q3 via current limiting resistor R11 and steering diode D6. Resistor R13 and R14 serve to hold pin

#4 and pin #6 of IC3 at power supply negative (−) potential until such time as pin #13 of IC4 transitions to power supply positive potential.

Due to the application of a positive (+) voltage potential to first flip-flop Reset pin #4 and Set pin #6, the first flip-flop is jammed, causing both output pin #1 and output pin #2 to rise to power supply positive (+) potential simultaneously.

By intentionally providing a third momentary interruption to Mains supply as described above, Toggle Circuit IC2 again provides a brief transition pulse between power supply negative (−) and power supply positive (+) to Clock pins #3 and #11 of the first and second flip-flops respectively, as well as providing a continuous positive (+) voltage to Gate of transistor Q3. As Drain of transistor Q3 is held positive by pin #13 of IC3, transistor Q3 is now forward biased, providing a positive (+) voltage to Base of NPN transistor Q2, where emitter of Q2 is connected to power supply negative, discharging timing capacitor C6 of IC1 in Reset Circuit. This causes IC1 to momentarily provide a reset pulse at pin #3 at power supply negative (−) subsequently resetting IC3 such that output pin #2 is again at power supply positive (+) and output pin #1 is returned to power supply negative (−) potential, thus restoring the circuit to its original state as described in initial application of Mains power. Zener diode Z3 will be discussed under 4*b* Switching Circuit.

Switch Circuit: (Refer to FIG. 1)

The Switch Circuit is comprised of Q3, Q4, R11-R13, ZNR 3 and IC3, where Q4 represents a Triac, being a high current AC Minas switching element and where resistor R13 serves to maintain Q4 in a non-conducting state by holding Q4 Gate to Main Terminal 1 (MT1) potential. As triac Q4 is non-conducting, Mains voltage made available at input terminal J2 is not passed to Mains load terminal J3, and where conventional or electronic fluorescent ballast or other lighting device would be connected between Load terminal J3, and where conventional or electronic fluorescent ballast or other lighting device would be connected between Load terminal J3 and Mains common terminal J1. The load terminals J1 and J3 are protected by ZNR3, an overvoltage and surge-absorbing device designed to protect remaining circuitry from electrical loads that may generate electrical noise or create inductive spikes.

Opto coupler IC4 serves to control Triac Q4 by raising the Gate potential of Q4 above that of MT1 by permitting current flow from Q4 Main Terminal 2 (MT2) through in #4 and pin #6 of IC4 and current limiting resistor R12. Light emitting Diode (LED) located within IC4 between pins #1 and #2 determine the state of the controlling element located between pins #4 and #6 of IC4.

The anode of LED (pin #1 of IC4) derives DC voltage via zener diode and current limiting resistor R11, where the zener voltage from that of the power supply voltage. This allows the LED within IC4 to extinguish during momentary power interruptions while filter capacitor C3 of Power Supply Circuit retains sufficient energy to temporarily maintain the Toggle Circuit memory. The cathode of LED (pin #2 of IC4) is controlled by Drain of transistor Q3, where Source of transistor Q3 is connected to power supply negative (−).

Upon initial application of Mains power at input terminals J1 and J2 as described above, output pin #1 of IC3 is at power supply negative (−), so as to prevent the forward bias of transistor Q3 which subsequently prevents the activation of IC3 and triac Q4. As pin #2 of IC3 is at power supply positive (+) potential, an artificial load is placed across the power supply by transistor Q2 and resistor R10, and serves to reduce internal heating of shunt regulator transistor Q1 by maintaining a constant current load on said power supply.

As described above, by providing a momentary interruption in the Mains supply, flip-flop IC3 will toggle, forcing output pin #1 to power supply positive (+), biasing transistor Q3, activating IC4, and in turn forcing triac Q4 into conduction, providing Mains voltage to conventional or electronic fluorescent ballast or other lighting means. Conversely, output pin #2 will fall to power supply negative (−) potential, disabling transistor Q2 and removing artificial load, as an equivalent energy level is no drawn by LED of IC4.

A second intentional interruption to Mains supply will toggle device back to original state, and triac Q4 will no longer conduct. This process is repeated with each momentary interruption to Mains supply. During prolonged absence of Mains power, device will default to the 'off' mode, where triac Q4 will be non-conducting upon application of Mains supply.

Switch Circuit: (Refer to FIG. 2)

The Switch Circuit is comprised of Q3, Q4-Q7, R15-R20, IC4,IC5, ZNR3 and ZNR4, where Q6 and Q7 represent Triacs, being high current AC Mains switching elements, and where resistors R19 and R20 serve to maintain Q6 and Q7 in a non-conducting state by holding Q6 and Q7 Gates to Main Terminal 1 (MT1) potential. As triac Q6 is held in a non-conducting state, Mains voltage made available at input terminal J2 is not passed to Mains load terminal J4, and where conventional or electronic fluorescent ballasts or other lighting devices would be connected between Load terminal J2 and J4 and Mains common terminal J1. Each of the output terminals J3 and J4 are protected by ZNR3 and ZNR4 respectively, and where ZNR3 and ZNR4 are overvoltage and surge absorbing devices designed to protect remaining circuitry from electrical loads that may generate electrical noise or create inductive spikes.

Opto-couplers IC4 and IC5 serve to control Triacs Q6 and Q7 respectively by raising the Gate potentials above that of MT1 by permitting a current flow between Main Terminals 2 (MT2) through pin #4 and pin #6 of opto-coupler IC4 and IC5 and current limiting resistors R17 and R18.

The anodes of LED (pin #1 of IC4 and IC5) derives DC voltage via zener diode Z3 and current limiting resistors R15 an R16, and where zener diode Z3 serves to reduce the voltage potential available to IC3 and IC5 by subtracting the zener voltage from that of the main power supply. This allows the LEDs within IC4 and IC5 to extinguish during momentary power interruptions while filter capacitor C3 of Power Supply Circuit retains sufficient energy to temporarily maintain the Toggle Circuit memory. The cathodes of LED (pin #2 of IC4 and IC5) are controlled by Drain of transistors Q4 and Q5, where the source of transistors Q4 and Q5 are connected to power supply negative (−).

Upon initial applications of Mains power to input terminals J1 and J2 as described above, output pin #1 of IC3 is at power supply negative (−), so as to prevent the forward bias (turn on) of transistor Q4, preventing the activation of IC4 and triac Q6. Conversely output pin #2 of IC3 is at power supply positive (+) thus activating LED in opto-coupler IC5, forcing triac Q7 into conduction. Forward conduction of triac Q7 makes available Mains voltage to output Load terminal J3 such that conventional or electronic fluorescent ballast or other lighting device of a first chosen wattage would be energized.

By intentionally providing a first momentary interruption of Mains supply, Toggle Circuit IC2 advances flip-flop IC3 as described above, such that output pin #1 of IC3 transitions from power supply negative (−) to power supply positive (+). Simultaneously, output pin #2 of IC3 transitions from power supply positive (+) to power supply (−), thus de-energizing opto-coupler IC5 and triac Q7 and energizing opto-coupler IC4 and triac Q6. Forward conduction of triac Q6 makes available Mains voltage to output terminal J4, such that conventional or electronic fluorescent ballast or other lighting device of a second chosen wattage would be energized.

By intentionally providing a second momentary interruption of Mains supply, Toggle Circuit IC2 forces flip-flop IC3 into a jammed mode as described above, such that output pin #1 and output pin #2 of IC23 are forced to power supply positive (+) potential, thus forward biasing both transistors Q4 and Q5. As transistor Q4 and Q5 are forward biased, opto-coupler IC4 and IC5 become active, placing triac Q6 and Q7 into conduction, providing Mains voltage to output terminals J3 and J4, such that either conventional or electronic fluorescent ballasts or other lighting devices provide the sum of the chosen wattages.

Theory Of Operation Of An Exemplary Embodiment: (Refer to FIGS. 4 and 6)

FIG. 4 represents a single stage toggling device for use with conventional or electronic fluorescent ballasts or other such lighting devices, and where energy savings and/or light level reductions may be required or desirable. Said Toggling device may be incorporated into existing lighting fixtures, and where said toggle device may be controlled (toggled) by way of conventional lighting control circuits or existing wall switches.

Toggle device may be incorporated into existing lighting fixtures such that one-half (½) of said lighting fixture will be directly wired to existing Mains supply, and where the remaining one half (½) of said lighting fixture will be connected in series with Toggling device.

Figure 6:
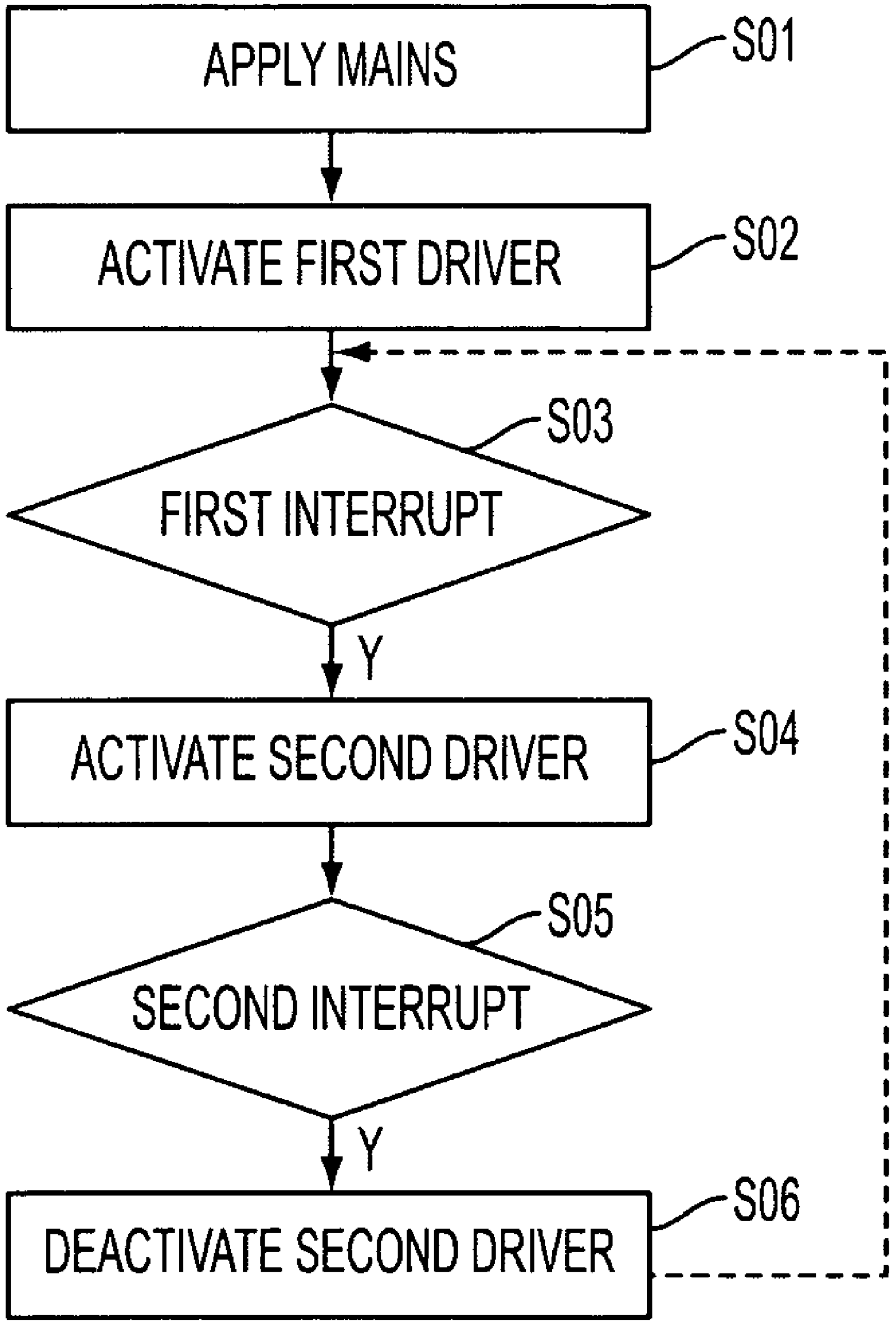
FIG. 6 is a flow chart illustrating a method for controlling light level output according to an exemplary embodiment of the present invention.

Referring to FIG. 6, upon initial application of Mains supply (S01), only that portion of the lighting fixture connected directly to existing Mains supply will be activated (S02), thus reducing energy consumption and provide reduced lighting levels. Momentary interruption (S03) of Mains supply via lighting control circuit or existing wall switch would causes said toggle device to transition, thus supplying Mains voltage to remaining portion of lighting fixture (S04), restoring fixture to original lighting levels. Each additional momentary interruption (S05) to Mains supply will toggle device between aforementioned "high" and "low" lighting levels (S06).

Toggle device will automatically return to a default 'low' or off state provided Mains supply has become absent for more than a few minutes, ensuring that initial application of Mains supply would provide a minimum or lowest possible light level and subsequently provide the greatest energy savings.

Theory Of Operation Of Another Exemplary Embodiment: (Refer to FIGS. 5 and 7)

FIG. 5 represents a two (2) stage toggle device for use with conventional or electronic fluorescent ballasts or other such lighting devices, and where energy savings and/or light level reductions may be required or desirable. Said Toggling device may be incorporated into existing lighting fixtures, and where said Toggle device may be controlled (toggled) by way of conventional lighting control circuits or existing wall switches.

Toggle device may be incorporated into existing lighting fixtures such that one third (⅓) of said lighting fixture will be connected to the first output terminal of the Toggle device, and where the remaining two thirds (⅔) of said lighting fixture will be connected to the second output terminal of Toggle device.

Figure 7:
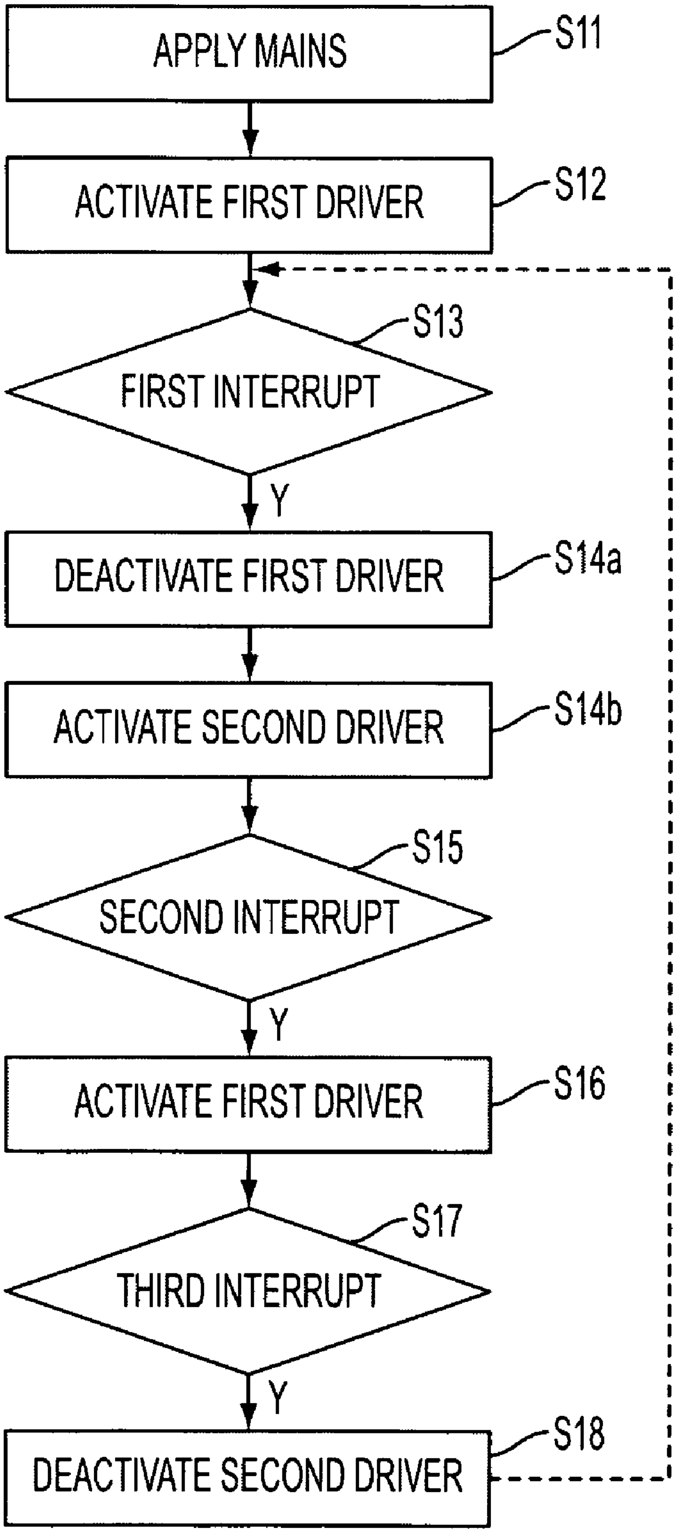
FIG. 7 is a flow chart illustrating another method for controlling light level output according to another exemplary embodiment of the present invention.

Referring to FIG. 7, upon initial application of Mains supply (S11), only the first one third (⅓) of the lighting fixture connected to the Toggle device will be activated (S12), thus reducing the overall energy consumption and lighting levels by two thirds (⅔). Momentary interruption (S13) of Mains supply via lighting control circuit or existing wall switch will cause the Toggle device to de-energize the first one-third (⅓) of the lighting fixture (S14*a*), energizing only the remaining two thirds (⅔) of said lighting fixture (S14*b*), providing two thirds (⅔) of the total energy consumption and light output levels. A second momentary interruption (S15) of Mains supply would activate both output terminals (S16), thus providing maximum light level output. Subsequent momentary interruptions (S17) to the Mains supply will repeat the sequence (S18) as described above.

Toggle device will automatically return to a default "low" state provided Mains supply has been absent for more than a few minutes, ensuring that initial application of Mains supply would provide a minimum or lowest possible light level and subsequently provide the greatest energy savings.

Numerous additional modifications and variations of the present invention are possible in light of the above teachings. For example, operation to ensure switching on a zero-crossing of an AC power can be implemented as explained below with reference to FIG. 1.

Upon application of DC voltage to Light Emitting Diode (LED) of IC4 via pins #1 and #2, the triac driver portion of IC4 (terminated by pins #4 and #6) will not go into a state of forward conduction until such time as the AC Mains sine waveform approaches or crosses zero voltage potential. As AC Mains sine waveform crosses zero voltage potential, Triac of IC4 will be allowed to enter into forward conduction by the integral LED, subsequently and simultaneously allowing Mains control Triac Q4 to enter a state of forward conduction. The purpose behind the use of a Zero Crossing Triac Driver such as IC4 is the elimination of excessive inrush currents being delivered to loads controlled by Mains control triac Q4. This approach is particularly important when loads are either capacitive or inductive. This approach also aids in the reduction of excessive Mains peak currents and the reduction of stress to Mains control triac Q4 and to any device or load connected to said triac Q4.

It is therefore to be understood that within the scope of the appended claims, the present invention may be practiced otherwise than as specifically described herein.

We claim:

1. A control circuit comprising:

a power supply circuit connected to an AC power source, the AC power source supplying AC power to a lighting system comprising a first driver for powering a first light source and a second driver for powering a second light source;

a toggle circuit responsive to a power level of the power supply circuit and providing a control output based on the power level; and a switch circuit receiving the control output from the toggle circuit and controlling the supply of the AC power to at least the second driver of the second light source based on the control output of the toggle circuit, wherein:

an initial application of the AC power to the power supply circuit causes a first driver to turn ON the first light source; and a first momentary interruption of the applied AC power to the power supply circuit detected by the toggle circuit after the initial application of the AC power causes the switch circuit to supply the AC power to the second driver to turn ON the second light source;

the lighting system further comprises a third light source;

the switch circuit controls supply of the AC power to the first driver of the first light source and to the second driver of the second light source based on the control output of the toggle circuit;

the first momentary interruption of the applied AC power to the power supply circuit detected by the toggle circuit after the initial application of the AC power further causes the switch circuit to cut the supply of the AC power to the first driver to turn OFF the first light source;

a second momentary interruption of the applied AC power to the power supply circuit detected by the toggle circuit after the first momentary interruption causes the switch circuit to supply the AC power to the first driver to turn ON the third light source.

2. The control circuit of claim 1, wherein the initial application of the AC power results in a lower brightness output level of the lighting system than the brightness output level after the first momentary interruption.

3. The control circuit of claim 1, further comprising a reset circuit configured to reset the control output of the toggle circuit after a prolonged absence of the applied AC power to the power supply circuit.

4. The control circuit of claim 1, wherein:

a third momentary interruption of the applied AC power to the power supply circuit detected by the toggle circuit after the second momentary interruption causes the switch circuit to cut the supply of the AC power to the second driver to turn OFF the third light source.

5. The controller of claim 1, wherein the first light source provides ⅓ of light output of the lighting system, the second light source provides ⅔ of light output of the lighting system, and the third light source provides full light output, equal to ⅓+⅔, of the lighting system.

6. The controller of claim 1, wherein the third light source comprises the first light source and the second light source.

7. A method for controlling supply of AC power comprising:

selectively supplying AC power to a first driver of a lighting system when initially supplying the AC power to the lighting system, the lighting system comprising a first driver for powering a first light source and a second driver for powering a second light source, the lighting system further comprising a third light source;

determining if a momentary interrupt of the AC power has occurred after initially supplying the AC power;

supplying the AC power to at least the second driver of the second light source when determining that a first momentary interruption of the AC power has occurred;

cutting the supply of the AC power to the first driver of the first light source when determining that the first momentary interruption of the AC power has occurred; and supplying the AC power to the first driver to turn ON the third light source when determining that a second momentary interruption of the AC power has occurred after the first momentary interruption.

8. The method of claim 7 further comprising:

cutting the supply of the AC power to the second driver to turn OFF the third light source when determining that a third momentary interruption of the AC power has occurred after the second momentary interruption.

9. The method of claim 7, wherein the first light source provides ⅓ of light output of the lighting system, the second light source provides ⅔ of light output of the lighting system, and the third light source provides full light output, equal to ⅓+⅔, of the lighting system.

10. The method of claim 7, wherein the third light source comprises the first light source and the second light source.

11. The method of claim 7, wherein the initial application of the AC power results in a lower brightness output level of the lighting system than the brightness output level after the first momentary interruption.

12. The method of claim 7, further comprising resetting of the determining if the momentary interrupt of the AC power has occurred after a prolonged absence of the AC power.

* * * * *